(12) United States Patent  
Nothum, Jr. et al.

(10) Patent No.: US 11,805,945 B2  
(45) Date of Patent: Nov. 7, 2023

(54) HEAT EXCHANGE TUBES FOR FRYER IN FOOD PROCESS LINE

(71) Applicants: Robert G. Nothum, Jr., Willard, MO (US); Ryan Doyle Nothum, Springfield, MO (US)

(72) Inventors: Robert G. Nothum, Jr., Willard, MO (US); Ryan Doyle Nothum, Springfield, MO (US)

( * ) Notice: Subject to any disclaimer, the term of this patent is extended or adjusted under 35 U.S.C. 154(b) by 487 days.

(21) Appl. No.: 17/025,393

(22) Filed: Sep. 18, 2020

(65) Prior Publication Data

US 2022/0151435 A1     May 19, 2022

Related U.S. Application Data

(60) Provisional application No. 62/901,983, filed on Sep. 18, 2019.

(51) Int. Cl.  
*A47J 37/12*          (2006.01)

(52) U.S. Cl.  
CPC ......... *A47J 37/1233* (2013.01); *A47J 37/128* (2013.01); *A47J 37/1214* (2013.01); *A47J 37/1247* (2013.01); *A47J 37/1266* (2013.01); *A47J 37/1242* (2013.01)

(58) Field of Classification Search  
CPC .............. A47J 37/1214; A47J 37/1242; A47J 37/1247; A47J 37/1257; A47J 37/1261  
See application file for complete search history.

(56) References Cited

U.S. PATENT DOCUMENTS

| | | | |
|---|---|---|---|
| 1,238,877 A * | 9/1917 | Bouda ................. | A47J 37/1214 122/45 |
| 1,928,009 A | 9/1933 | Dornier .................... | B24C 3/185 |
| 1,960,557 A | 5/1934 | Snyder .................. | F16L 43/001 |
| 2,429,360 A | 10/1947 | Kells .................... | A47J 37/1247 |
| 2,663,321 A | 12/1953 | Jantsch .................... | B02C 2/005 |
| 3,451,434 A | 6/1969 | Bauer, Jr. ................ | F16L 9/006 |
| 4,794,985 A | 1/1989 | Paulman et al. .......... | F28D 1/08 |

(Continued)

FOREIGN PATENT DOCUMENTS

| | | | |
|---|---|---|---|
| GB | 760393 | 10/1956 | ............ A47J 7/1247 |
| JP | 2013219126 A * | 10/2013 | |
| WO | WO 99/08583 | 2/1999 | .............. A47J 37/12 |

*Primary Examiner* — Reginald Alexander  
(74) *Attorney, Agent, or Firm* — Jonathan A. Bay

(57) ABSTRACT

A metal heat exchange tube assembly for a fryer cooking channel of a hot oil fryer for food-process lines has a plurality of elongate, rectangular, longitudinally-extending heat exchange tubes with open inflow and outflow ends; a laterally-extending abbreviated rectangular inflow-manifold tube with a plurality of apertures in a sidewall; and a laterally-extending abbreviated rectangular outflow-manifold tube with the same. The plurality of heat exchange tubes are joined to the inflow-manifold and outflow-manifold tubes with respective alignment among the open ends of the heat exchange tubes and the apertures in the sidewalls of the manifold tubes. The heat exchange tubes comprise a composite construction of an elongate, square-U shaped channel having a web bottom wall and flange sidewalls of a given uniform thickness, and an elongate closure strip welded along spaced seams to the exposed upper edges of the flanges of the channel, thereby forming a thermal oil conduit.

17 Claims, 16 Drawing Sheets

(56) References Cited

U.S. PATENT DOCUMENTS

| | | | |
|---|---|---|---|
| 4,895,137 A | | 1/1990 | Jones et al. ......... A47J 37/1247 |
| 5,186,250 A | * | 2/1993 | Ouchi .................... F28F 3/042 |
| | | | 165/177 |
| 5,417,202 A | | 5/1995 | Cote ................... A47J 37/1247 |
| 5,577,438 A | | 11/1996 | Amitrano et al. ....... G02B 6/04 |
| 6,305,274 B1 | | 10/2001 | Nothum, Sr. et al. .. A47J 37/12 |
| 7,886,657 B2 | | 2/2011 | Nothum, Jr. ............. A21C 9/04 |
| 9,642,493 B2 | | 5/2017 | Nothum, Jr. .......... A47J 37/142 |
| 2009/0059423 A1 | * | 3/2009 | Yamada ................ G11B 5/314 |
| | | | 360/122 |
| 2010/0037976 A1 | | 2/2010 | Toyotake et al. ......... F16L 9/00 |
| 2010/0247726 A1 | * | 9/2010 | van der Eerden .. A47J 37/1214 |
| | | | 426/438 |
| 2015/0082997 A1 | * | 3/2015 | Nothum, Jr. ........ A47J 37/1233 |
| | | | 99/404 |
| 2016/0223264 A9 | * | 8/2016 | Desikan ................ F28F 3/025 |
| 2018/0172355 A1 | * | 6/2018 | Takase .................... F28F 27/02 |

\* cited by examiner

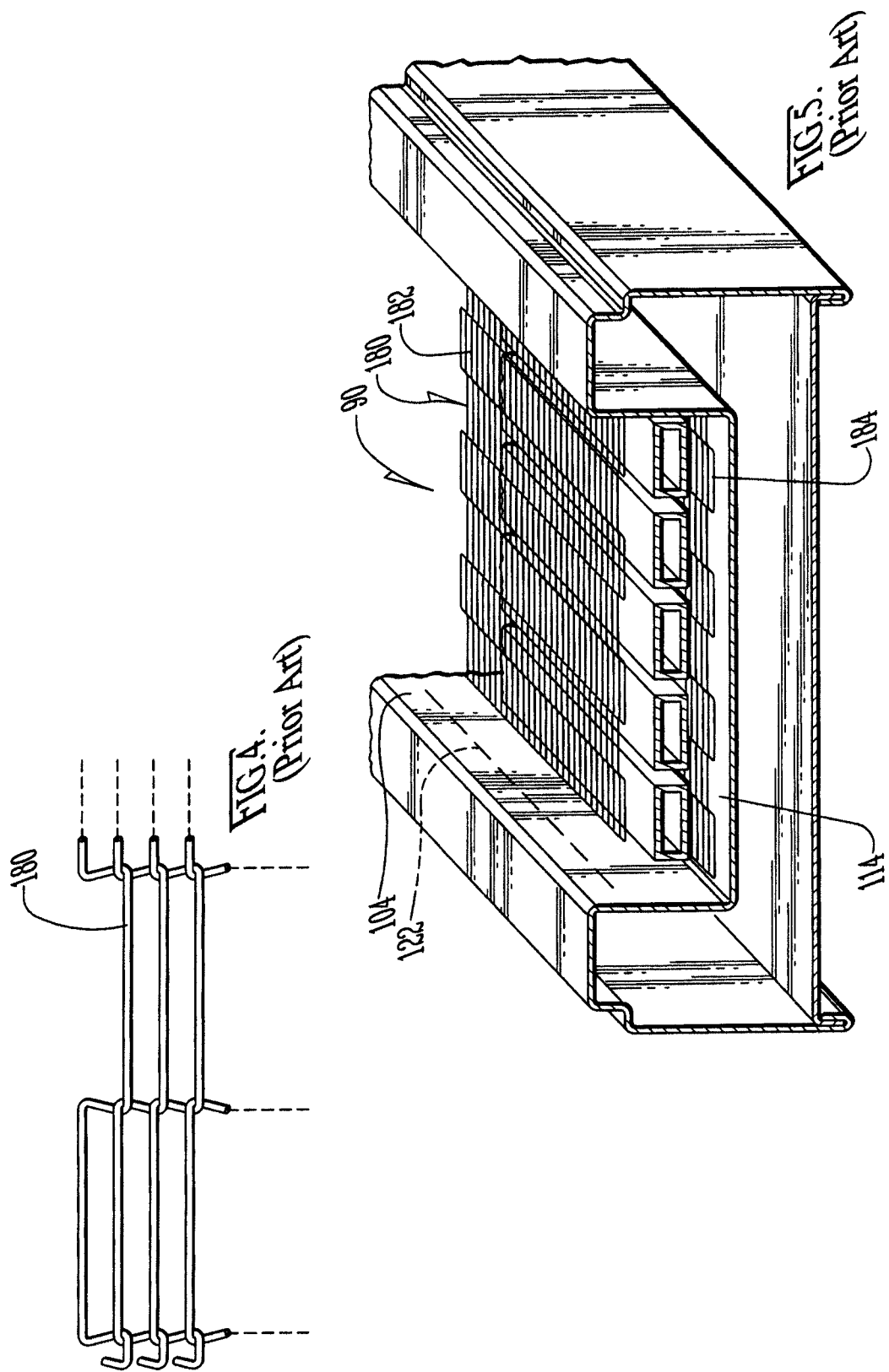

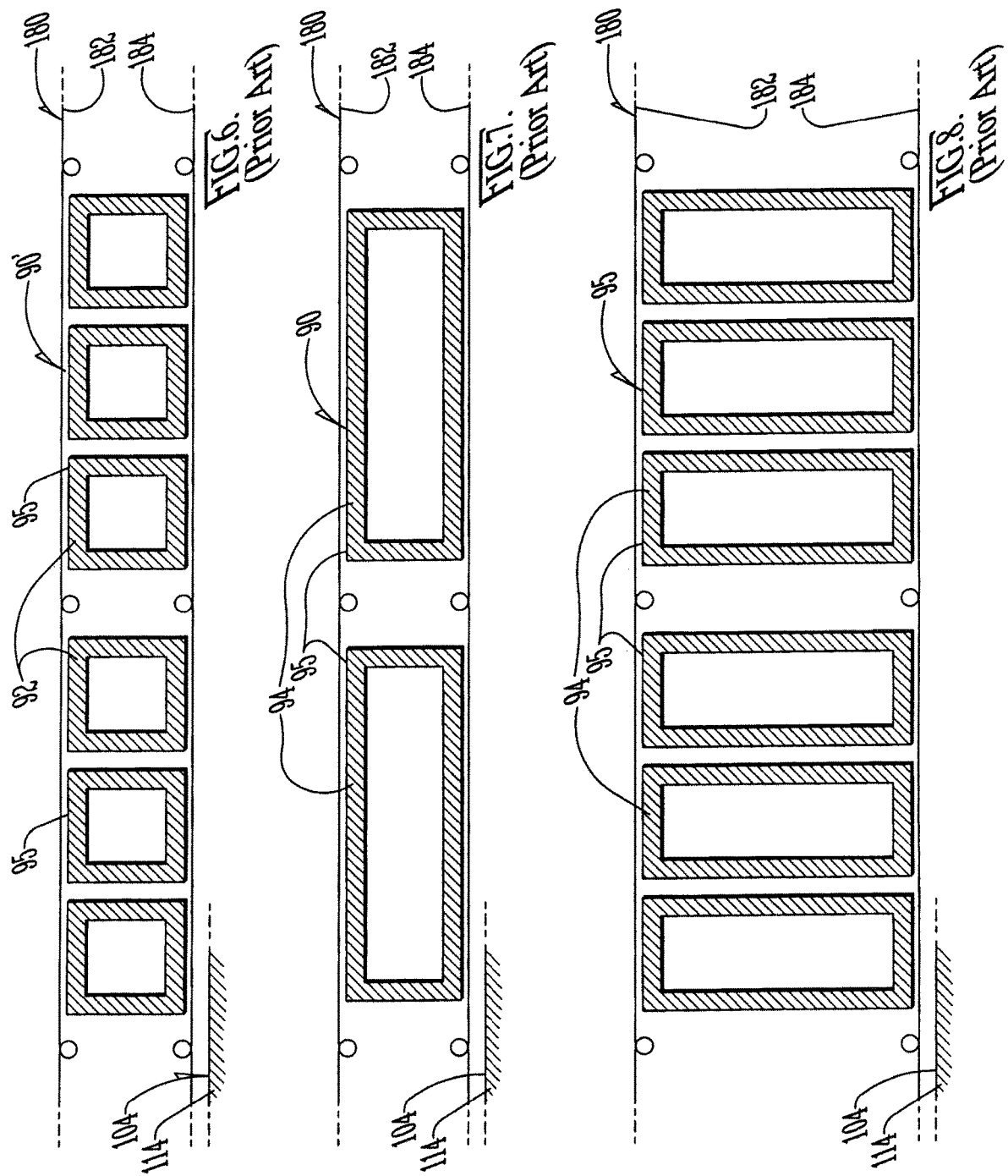

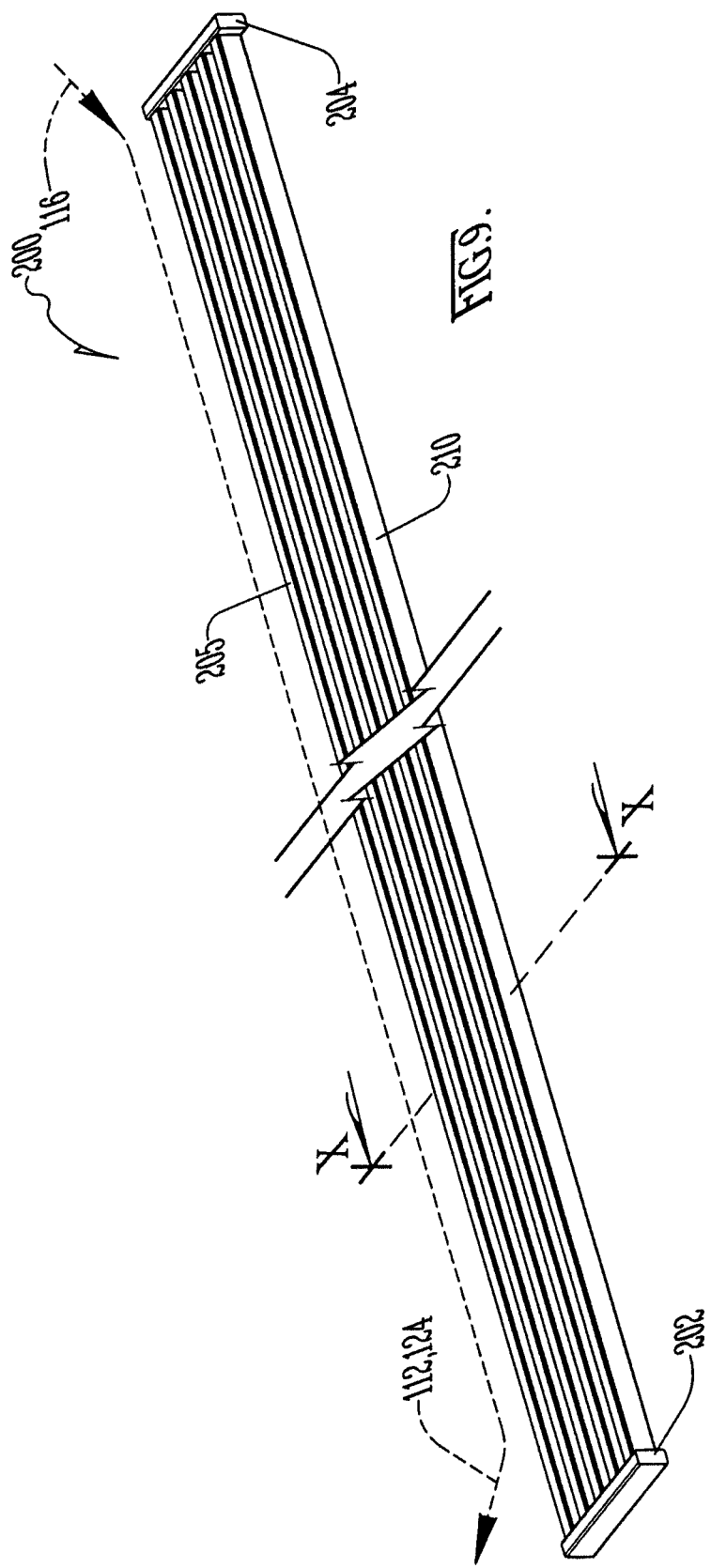

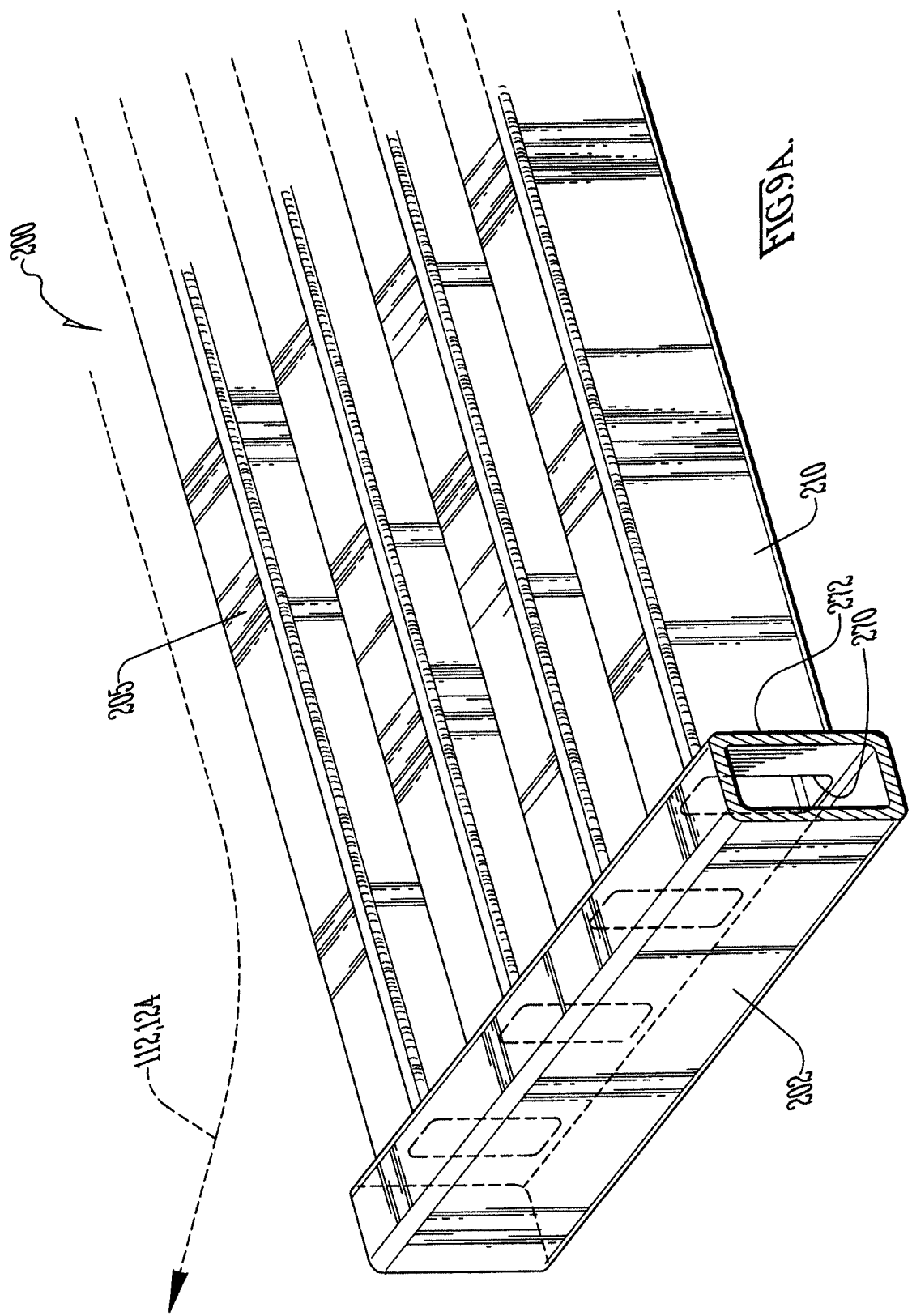

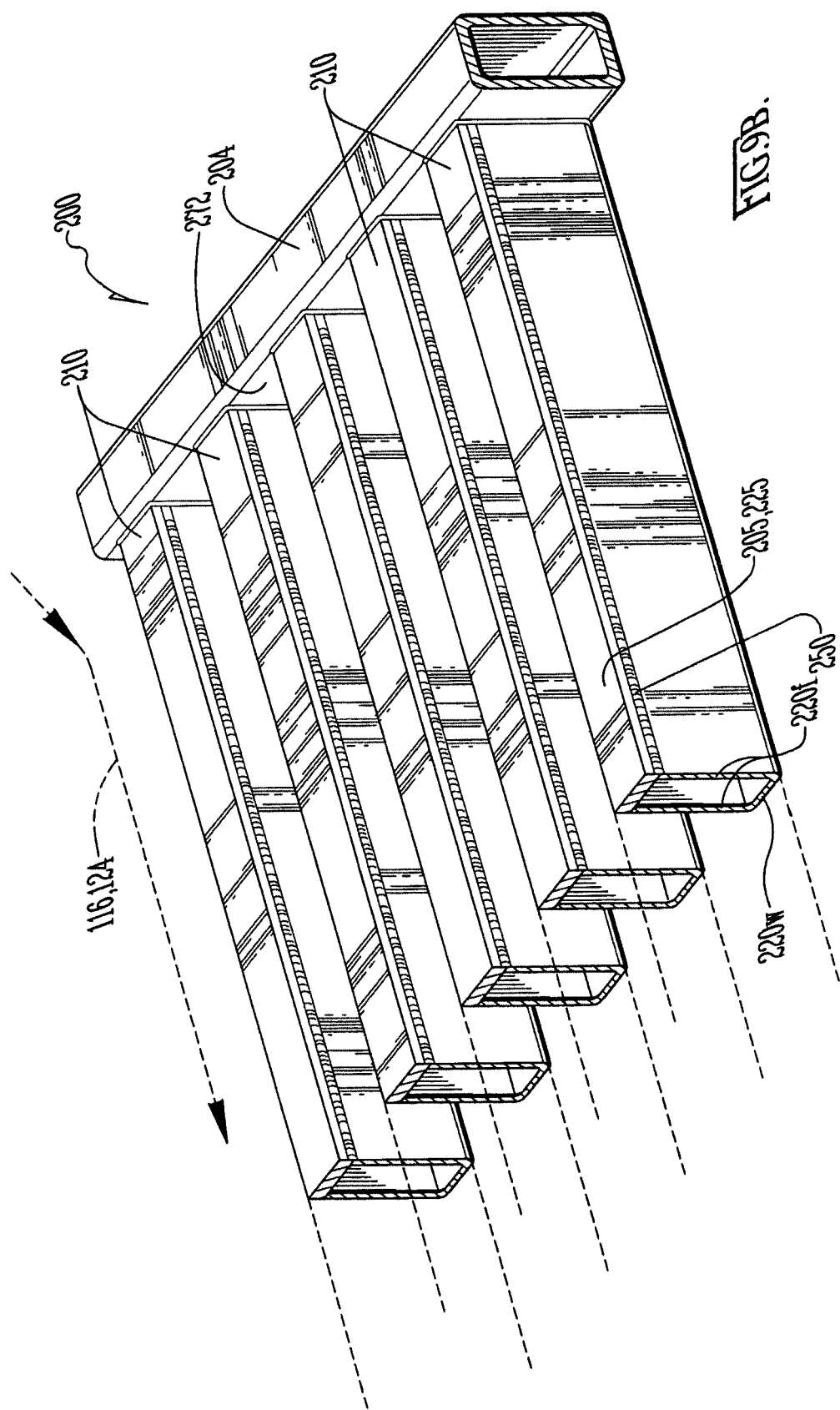

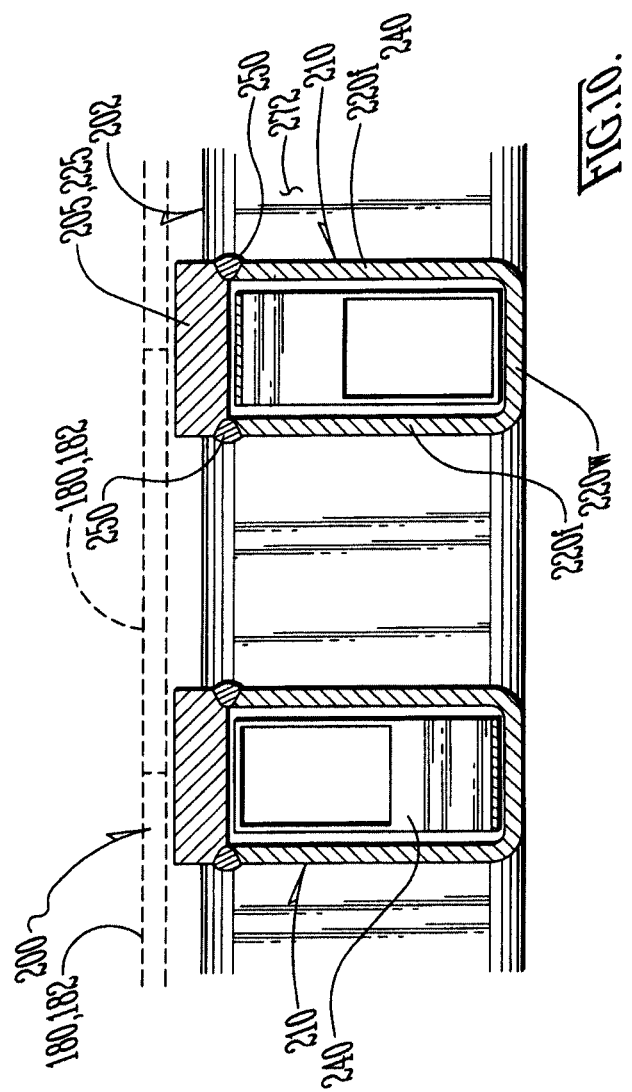

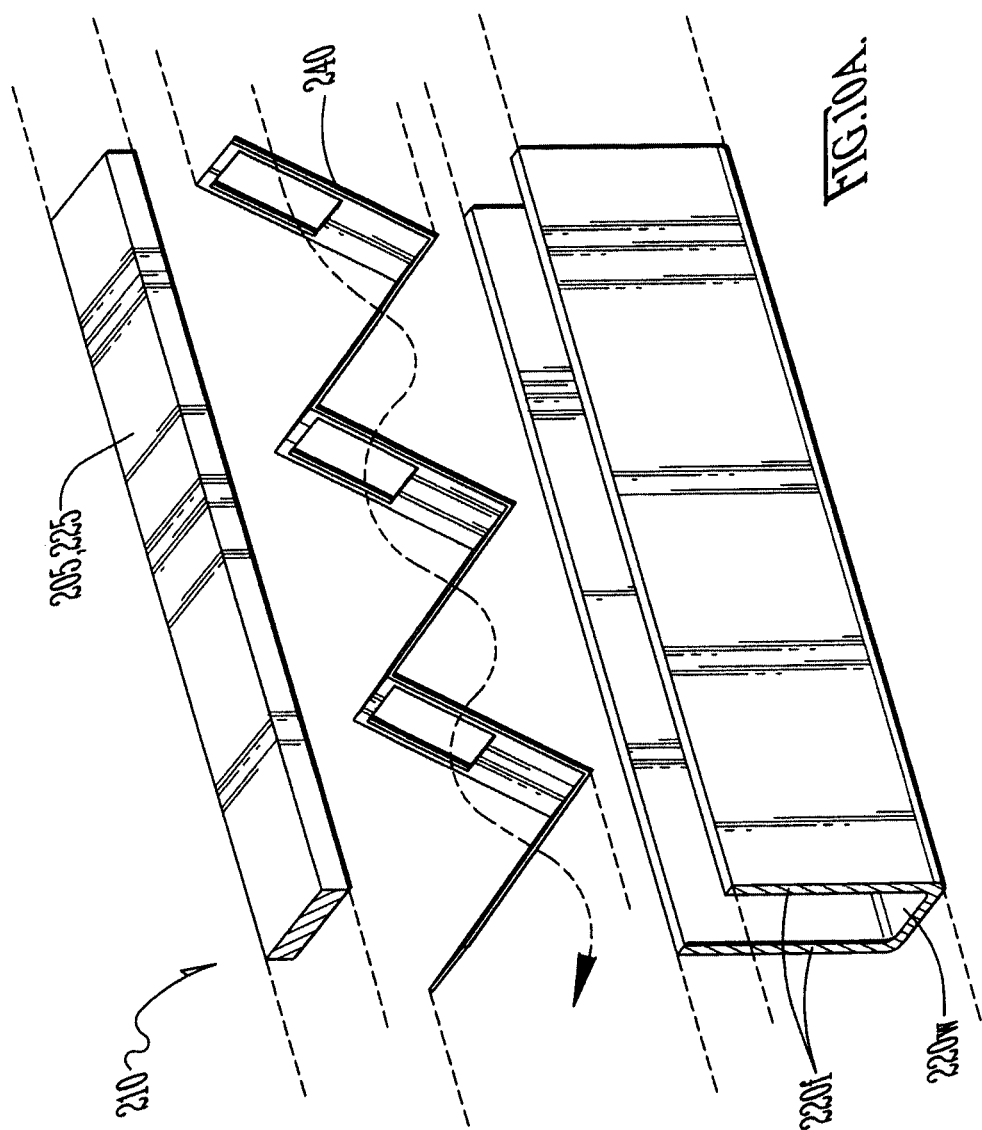

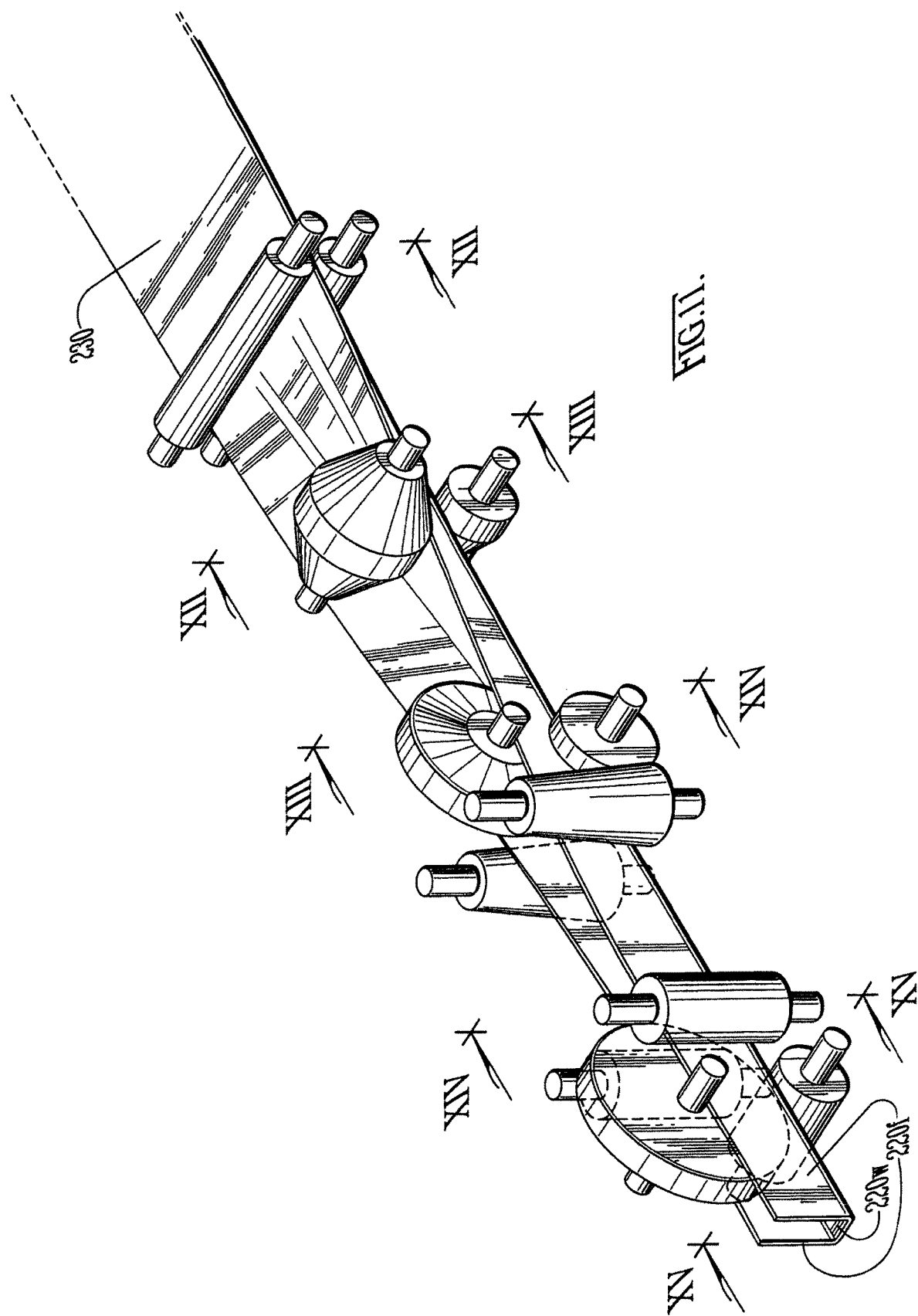

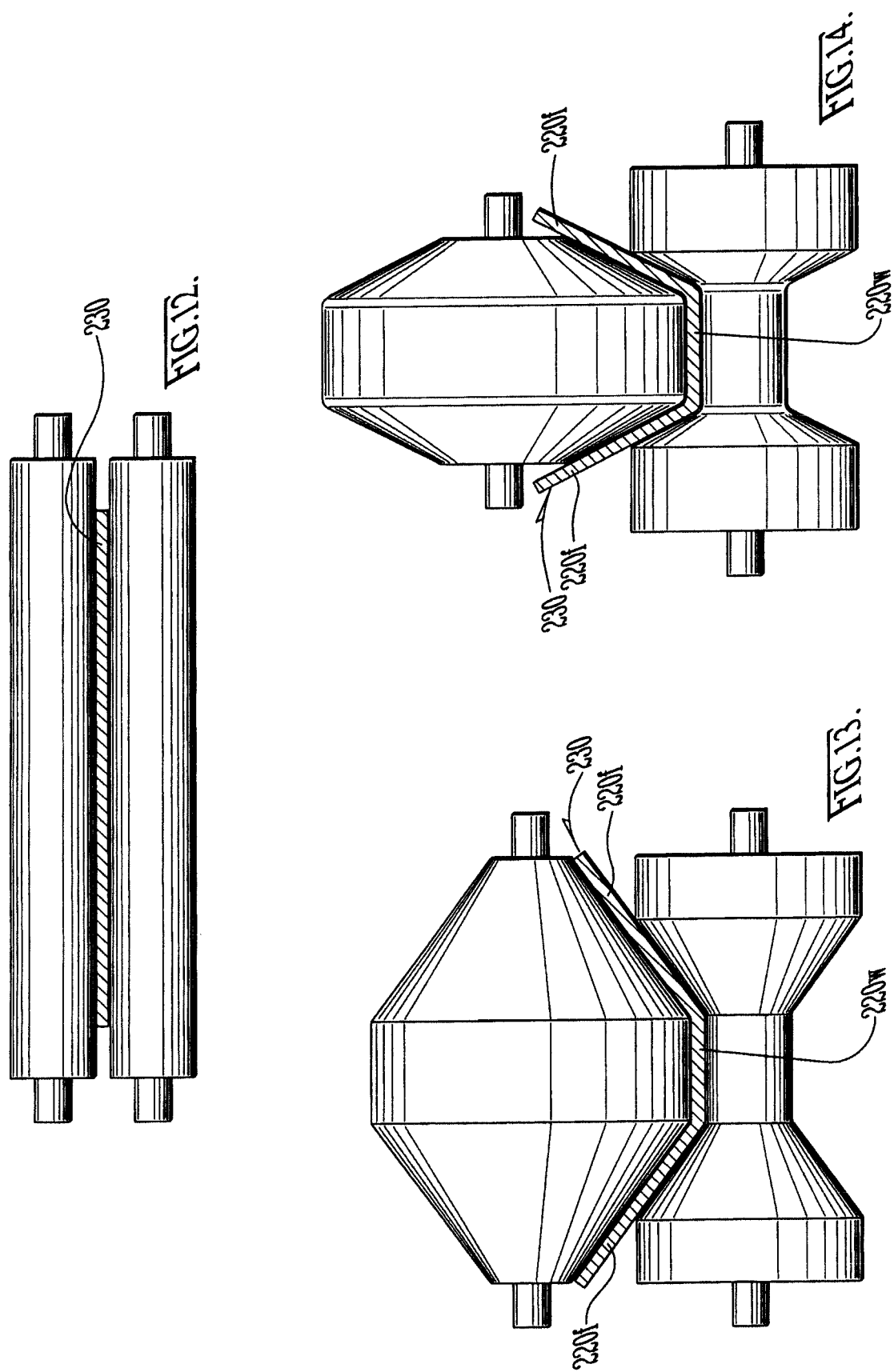

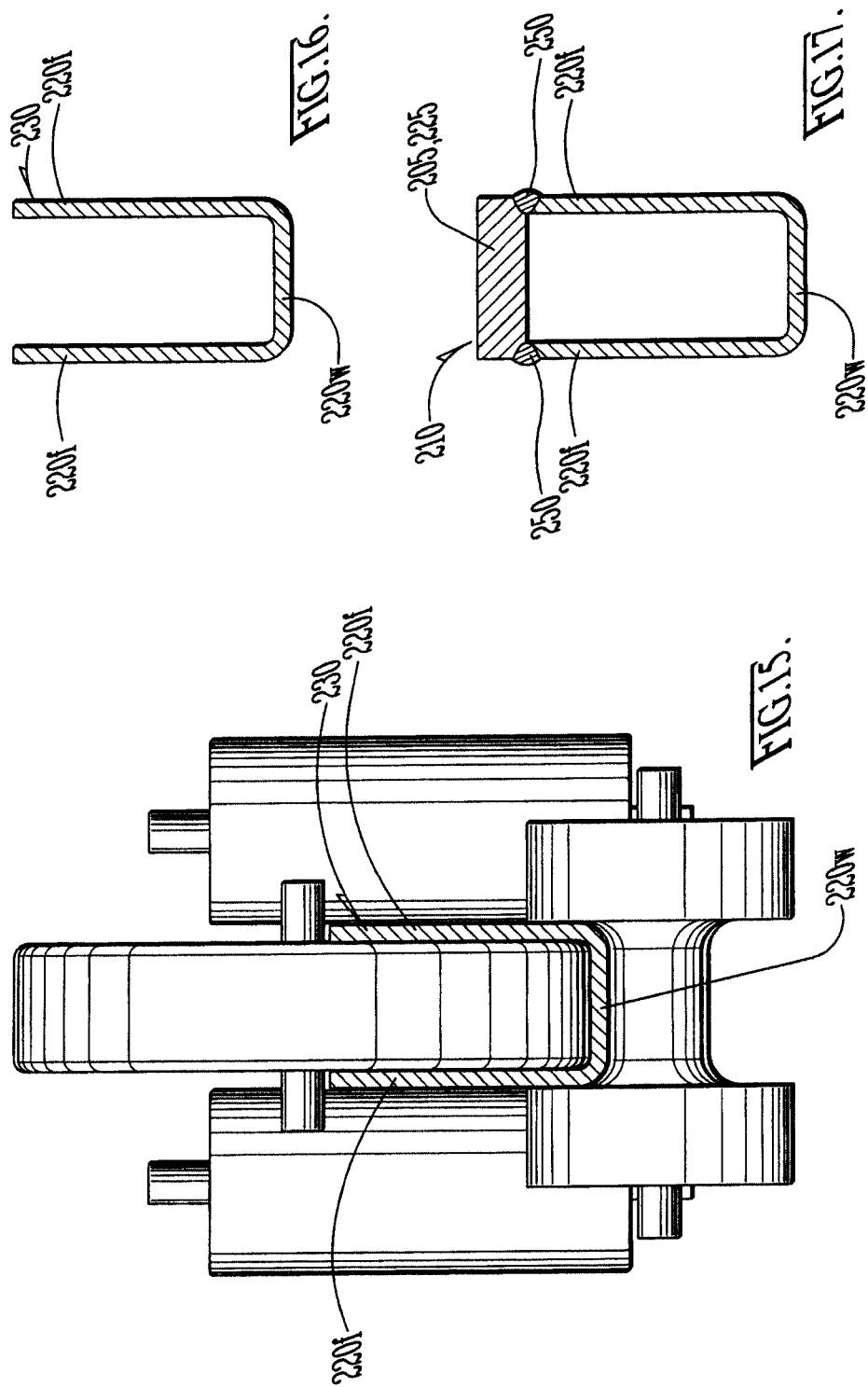

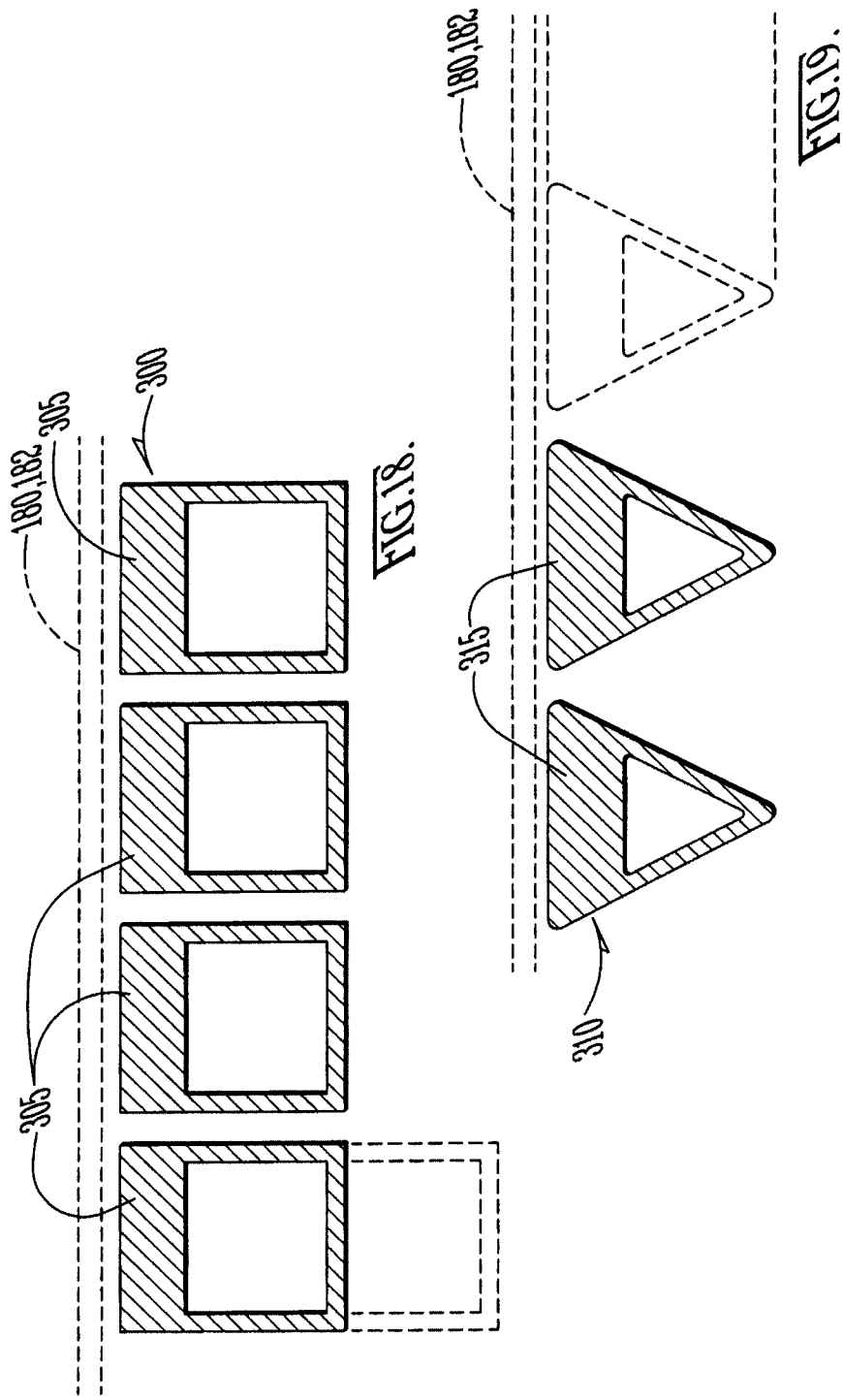

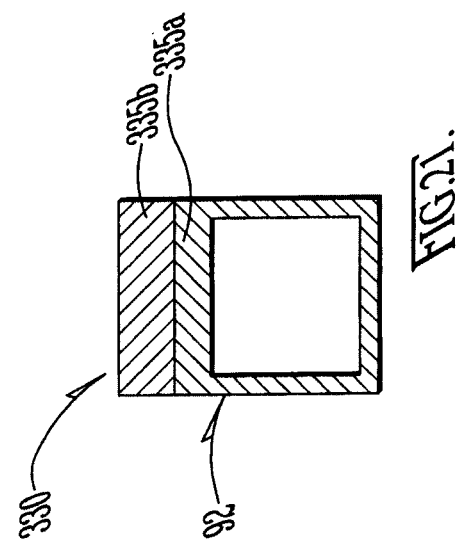
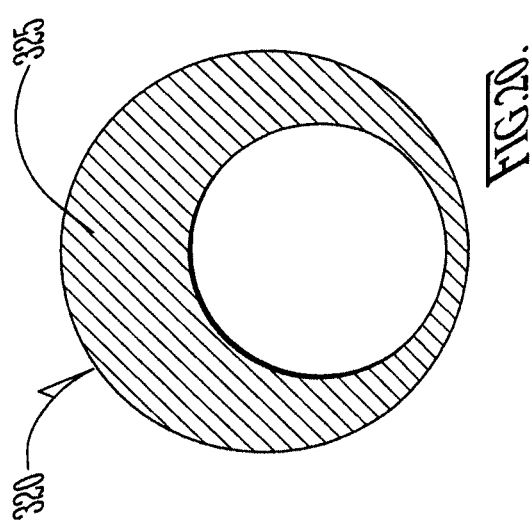

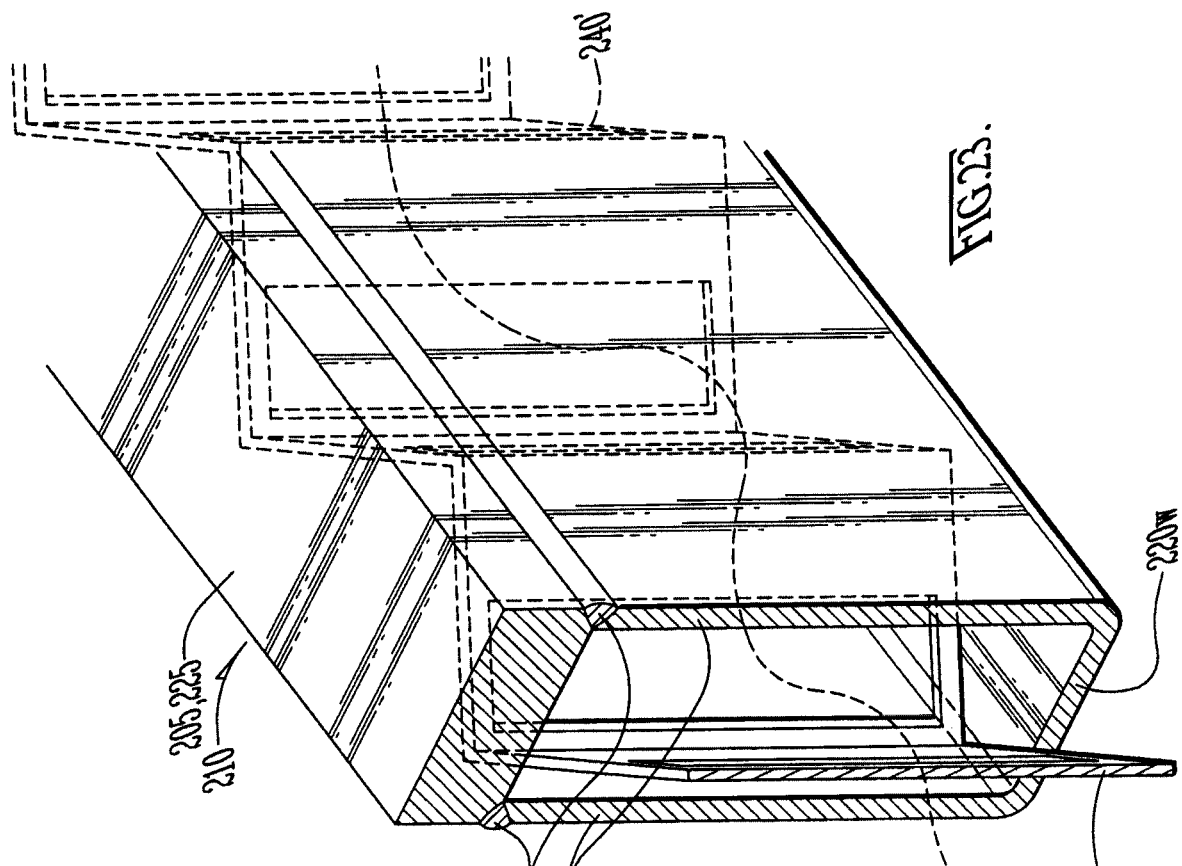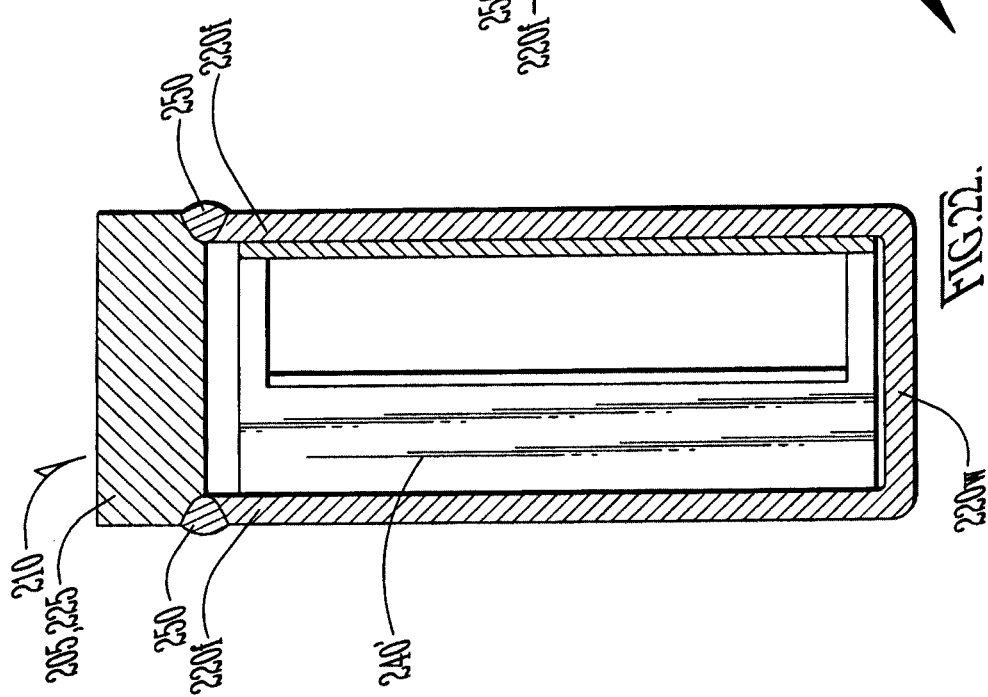

HEAT EXCHANGE TUBES FOR FRYER IN FOOD PROCESS LINE

CROSS-REFERENCE TO PROVISIONAL APPLICATION(S)

This application claims the benefit of U.S. Provisional Application No. 62/901,983, filed Sep. 18, 2019. The foregoing patent disclosure is incorporated herein by this reference thereto.

BACKGROUND AND SUMMARY OF THE INVENTION

The invention generally relates to automatic and/or mechanized food-process line equipment and, more particularly, heat exchange tubes for hot oil fryers in food process lines that eliminate wear strips which have clean-out issues, buckling and added moving parts.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 4 is a top plan view of a wire mesh conveyor belt of the prior art, typically stainless steel;

FIG. 5 is a perspective view of a heat exchange tube assembly in accordance with the prior art, disposed in a fryer cooking channel, partly in section;

FIG. 6 is a transverse section view comparable to FIG. 5 except showing an alternate assembly of heat exchanger tubes in accordance with the prior art, with an endless wire mesh conveyor belt included to depict its position wherein an upper food-product carrying run scrapes along the top of the heat exchanger tubes while a lower return run scrapes along the bottom of the fryer cooking channel;

FIG. 7 is an enlarged-scale transverse section view of the FIG. 5 heat exchange tube assembly in accordance with the prior art, again with an endless wire mesh conveyor belt included to depict its position wherein an upper food-product carrying run scrapes along the top of the heat exchanger tubes while a lower return run scrapes along the bottom of the fryer cooking channel;

FIG. 8 is a transverse section view comparable to FIG. 7 except showing the heat exchanger tubes arranged vertically;

FIG. 9 is a perspective view of a heat exchange tube assembly in accordance with the invention, which will lie stretched out more or less longitudinally and horizontally in the fryer cooking channel (like as shown in FIG. 3 or 5);

FIG. 9A is an enlarged-scale perspective view of a laterally-extending abbreviated inflow-manifold tube for the heat exchange tube assembly of FIG. 9;

FIG. 9B is an enlarged-scale perspective view a laterally-extending abbreviated outflow-manifold tube for the heat exchange tube assembly of FIG. 9

FIG. 10 is a section view taken along line X-X in FIG. 9, showing that the top wall portion of the heat exchange tubes is thicker than sidewall and bottom wall portions, so as to provide extended life for the heat exchange tubes as the an upper food-product carrying run of the stainless steel, wire-mesh, main conveyor belt (shown in dashed lines) gradually erodes away the top wall portion;

FIG. 10A is an enlarged-scale perspective view of one heat exchange tube in isolation from FIG. 9, at a time before the closure strip of a relatively thick stock plate that will serve as the top wall is welded onto the exposed edges of the flanges of the channel that defines the side and bottom walls and which channel is produced of a relatively thinner stock of plate material (or even sheet material, which is thinner than plate), wherein the time referenced here affords the opportunity to introduce and lay inside the open channel an elongate and flimsy static flow mixer technology that could otherwise could never be snaked in through an open end;

FIGS. 11-17 comprise a series of illustrations depicting manufacturing processes for producing a preferred embodiment of a heat exchange tube in accordance with the invention for hot oil fryers in automatic and/or mechanized food process lines, wherein:

FIG. 11 is a perspective view providing an abbreviated representation of a roll forming process for producing steel channel out of flat sheet stock, or thin-plate stock;

FIG. 12 is a section view taken along line XII-XII in FIG. 11, showing the rolling feed of flat plate or sheet stock;

FIG. 13 is a section view taken along line XIII-XIII in FIG. 11, showing the rolling roll-forming of the flat plate or sheet stock into a shallow V-shape;

FIG. 14 is a section view taken along line XIV-XIV in FIG. 11, showing the progression of the rolling roll-forming wherein the shallow V-shaped plate or sheet stock has been formed into a deeper V-shape;

FIG. 15 is a section view taken along line XV-XV in FIG. 11, showing the progression of the rolling roll-forming wherein the deeper V-shaped plate or sheet stock has been formed into a channel shape;

FIG. 16 is a section view showing the resultant steel channel in isolation; and

FIG. 17 is a section view showing the steel channel closed by an elongate closure strip of plate welded to the exposed edges of the upright flanges of the channel all the way along the opposite seams, including by the preferred welding technique of TIG welding;

FIG. 18 is a section view comparable to FIG. 17 except showing an alternate configuration of heat exchange tubes in accordance with the invention having top wall portions that are thicker than the side and bottom wall portions, so as to provide extended life for the heat exchange tubes as the stainless steel wire mesh conveyor belt gradually erodes away the top wall portion, wherein this configuration is presumptively a product of an extrusion process, which is not highly preferred because of cost;

FIG. 19 is a section view comparable to FIG. 18 except showing still another configuration of heat exchange tubes in accordance with the invention having top wall portions that are thicker than the side and bottom wall portions, wherein this configuration is presumptively likewise a product of an extrusion process, and which again is not highly preferred because of its cost;

FIG. 20 is a section view comparable to FIGS. 18 and 19 except showing still a further configuration of heat exchange tubes in accordance with the invention having top wall portions that are thicker than the side and bottom wall portions, wherein this configuration is once more presumptively a product of an extrusion process, and which is again not highly preferred because of its cost;

FIG. 21 is a section view of a heat exchange tube in accordance with the invention and comparable to those in FIG. 9, and showing this FIG. 21's heat exchange tube's thicker composite top wall, wherein here the top wall comprises two plies that cooperatively present a relatively thicker combined-state by taking a tube with a constant wall thickness and adding a strip of material on top and affixing it to the constant wall thickness tube, which would be welded all the way along the opposite seams;

FIG. 22 is an enlarged-scale section view of one heat exchange tube in isolation from FIG. 10, except containing an alternate embodiment of static flow mixer technology; and FIG. 23 is a perspective view, partly in section, of the heat exchange tube in FIG. 22, wherein this perspective view is comparable to the perspective view of FIG. 10A except not only showing the closure strip welded shut but also showing the alternate embodiment of static flow mixer technology shown in FIG. 22, wherein at a time before the closure strip was joined the open-top condition of the channel readily affords the opportunity for insertion into the channel of this or some form of static flow mixer technology, which could as simple as chicken wire if tolerable, or an elongate coil spring with open coils.

DETAILED DESCRIPTION OF THE PREFERRED EMBODIMENTS

Figure 1:
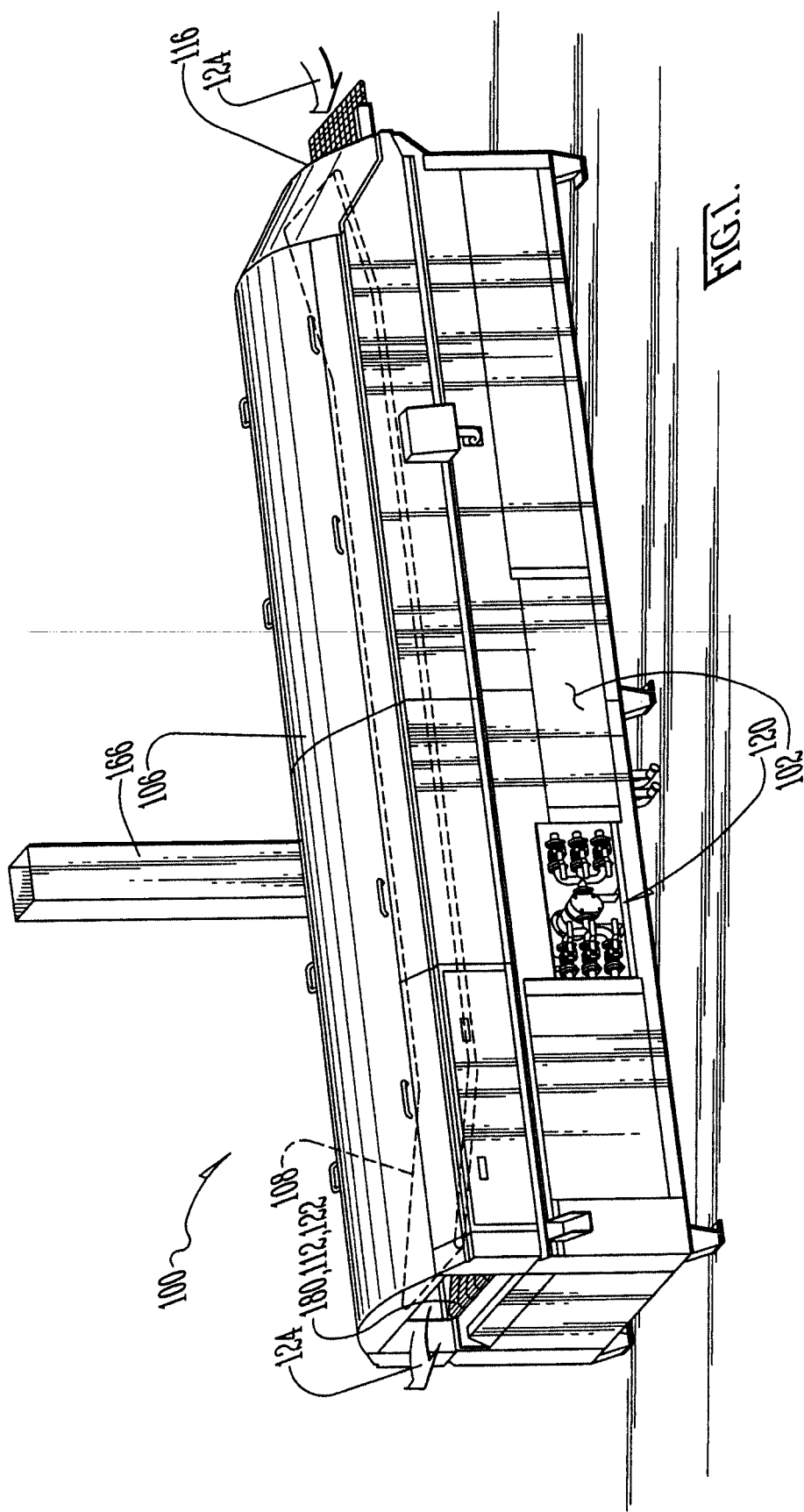
FIG. 1 is a perspective view of a hot oil fryer in accordance with the invention for automatic and/or mechanized food process lines, which hot oil fryer is combined with thermal oil heating and heat exchange housed within or attached to the same cabinet as for the bath (e.g., fryer cooking channel) for the frying oil.
Figure 2:
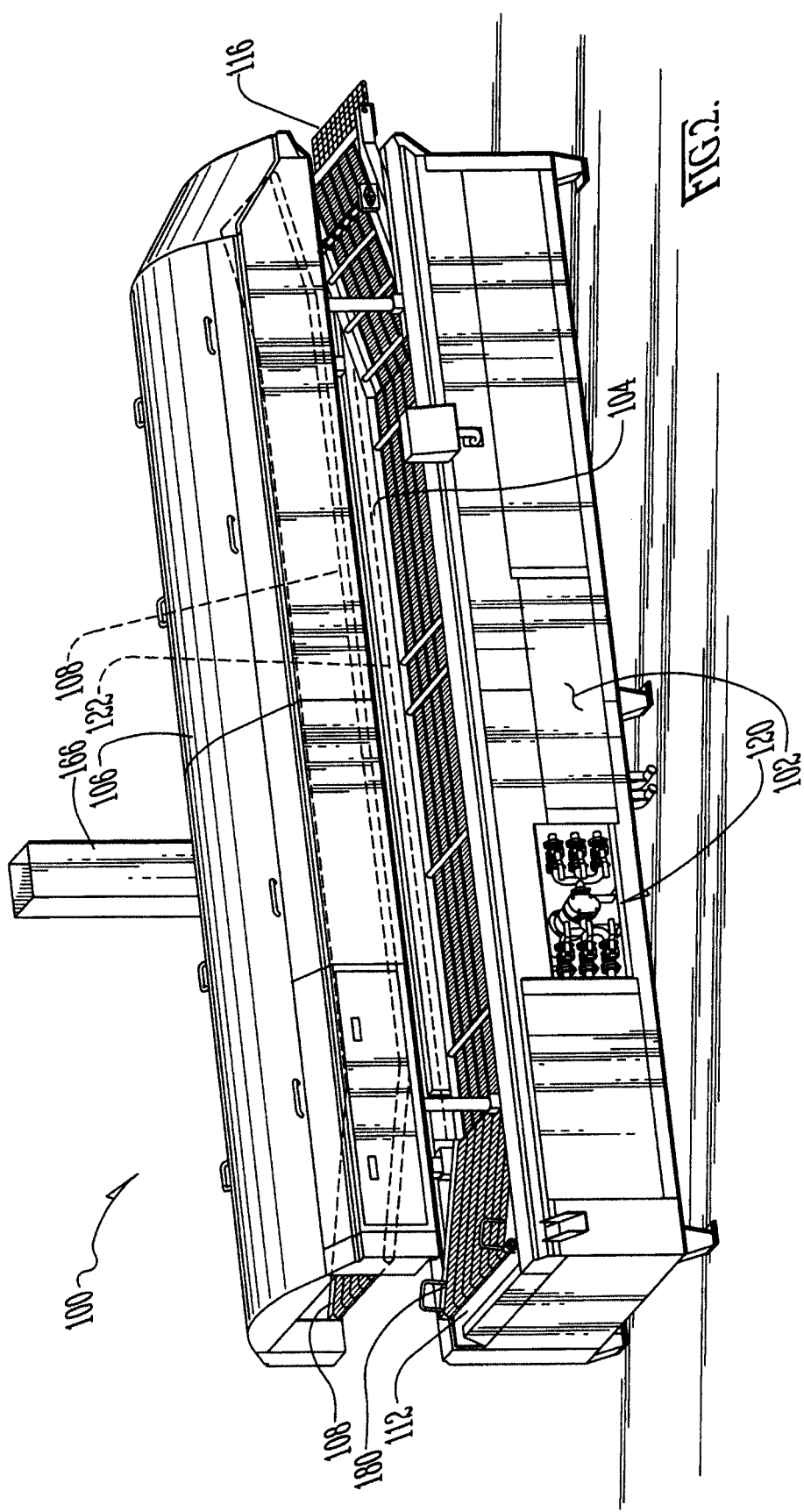
FIG. 2 is a perspective view comparable to FIG. 1 except showing the hood driven to an elevated non-use (e.g., cleaning and/or maintenance) position, and carrying the submerging conveyor with it.
Figure 3:
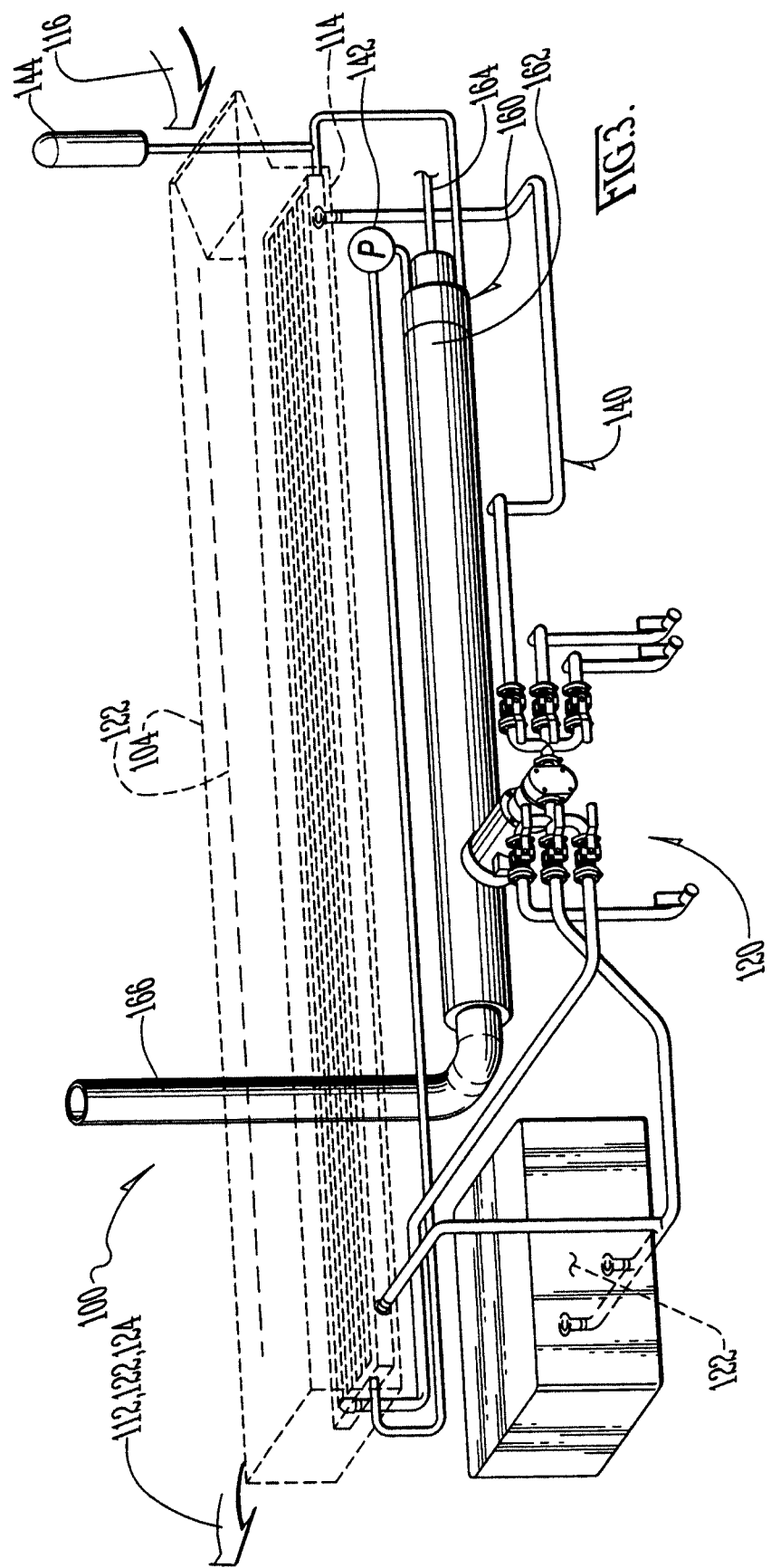
FIG. 3 is a 'perspective' schematic of the operative components of the hot oil fryer in accordance with the invention which is combined with thermal oil heating and heat exchange tube in or attached to the same cabinet as for the bath (e.g., fryer cooking channel) for the frying oil.

FIGS. 1 through 3 show a hot oil fryer 100 and system 120 in accordance with the invention for automatic and/or mechanized food process lines. The hot oil fryer 100 is combined with thermal oil heating and heat exchange systems 160 and 140 housed within or attached to the same cabinet 102 as for the bath (e.g., fryer cooking channel 104) for the frying oil 122.

FIG. 2 shows the hood 106 for the hot oil fryer 100 driven to an elevated non-use (e.g., cleaning and/or maintenance) position, and carrying the submerging conveyor 108 upward with it. This submerging conveyor 108 is a big culprit in creating a problem, which will be more particularly described below, for which it is an object of the invention to ameliorate.

FIG. 3 is a 'perspective' schematic of the operative components 120, 140 and 160 of the hot oil fryer 100 in accordance with the invention which is combined with thermal oil heating and heat exchange systems 120 and 140 in or attached to the same cabinet 102 as for the bath (e.g., fryer cooking channel 104) for the frying oil 122.

There are at least two (2) oil systems 120 and 140 here:
1—the frying oil 122 in which the food product 124 is immersed; and
2—a thermal working oil flowing (e.g., by virtue of pump 142) in a closed system 140 to heat the frying oil 122.

There are standard industrial choices for the thermal working oil. It's not important which is used. But it is important that the flow system 140 for the thermal working fluid is provided with a high-output heat source 162. Electric resistance heating is an optional heat source, but it is usually not as preferred as a combustion heat source 162. Hence it is typical that there is a third oil system 160 involved.

Such a third oil system 160 would be a fuel oil system 160 that supplies a combustion chamber 162 with a combustible fuel supply 164. Again, so instead of electric resistance heat, the combustion chamber 162 includes internal heat exchangers (not visible in the view) that exchange the heat of combustion of the fuel oil 164 with the thermal working fluid flowing (e.g., by virtue of pump 142) inside the heat exchangers of the combustion chamber 162 (again, the heat exchangers within the combustion chamber 162 are not visible in the view). The combustion gases exhaust out a flue 166.

The thermal working fluid flows (by virtue of pump 142) inside a closed system 140 (or essentially closed, excluding safety pressure releases 144). The thermal working fluid absorbs a fresh input of heat from the combustion chamber 162 and transfers away that heat into the heat exchange tube assembly 90 of the hot oil fryer 100 that lie stretched out in the bath (e.g., fryer cooking channel 104) for the frying oil 122. Again, the thermal working fluid flows (by virtue of pump 142) inside an essentially closed system 140 but there is a pressure release/stabilization standpipe 144 for safety against over-pressurization events.

The fry oil 122 is a food grade fry oil. Olive oils and other oils are generally not used as they are considered to be too delicate for fry service. But there are a lot of other choices of vegetable and hydrogenated oils that serve fry duty very well. During food process line operations, fried food product 124 discharged from the hot oil fryer 100 continually carries away some significant weight percent of the fry oil 122 at discharge. Hence the fry oil 122 is continually being depleted in this manner by this transit out the discharge end 112. To account for this, fresh fry oil 122 has to be continually added to the fryer cooking channel 104 to keep the fry oil 122 within limits of a specified fill level. This is not the same with the thermal working oil. There is no depletion of the thermal working oil in the thermal working oil system 140 in the same manner.

FIG. 4 shows a wire mesh conveyor belt 180 that is popular in food process lines. It is stainless steel. FIG. 5 shows (partly in section) an elongate, flat heat exchange tube assembly 90 in accordance with the prior art, stretched out in the fryer cooking channel 104 (eg., the fry oil bath). FIG. 7 is an enlarged-scale transverse section view of the FIG. 5 heat exchange tube assembly 90 in accordance with the prior art. FIG. 6 is comparable to FIGS. 5 and 7 except showing an alternate assembly 90' of heat exchanger tubes 92 in accordance with the prior art. FIG. 8 is a transverse section view comparable to FIG. 7 except showing the heat exchanger tubes 94 arranged vertically.

All of FIGS. 5 through 8 show representation of an endless wire mesh conveyor belt 180. This is the main food-product motivating conveyor belt 180 and has an upper food-product carrying run 180 that scrapes along the top of the heat exchanger tubes 95 while a lower return run 184 scrapes along the bottom 114 of the fryer cooking channel 104.

To return to the lower return run 184, it truly just scrapes along the bottom 114 of the fryer cooking channel 104.

In contrast, the upper food-product carrying run 182 does not just merely scrape along the top 95 of the heat exchanger tubes 92 or 94. It does something more. Returning back to FIG. 1, there is an upper submerging convey 108 that is applying pressure on top of the food product 124 traveling on the upper food-product carrying run 182 of the main (underpassing) conveyor 180.

The underpassing main conveyor 180 and the overhead submerging conveyor 108 run at the same speed and cooperate in part to submerge food product 124 below the surface of the fry oil 122, and thus so that the food product 124 is wholly immersed and exposed to fry oil 122 on all sides.

However, the extra pressure supplied by the submerging conveyor 108, first directly on top of the food product 124, and then (by transmission) indirectly onto the upper food-product carrying run 182 of the main conveyor 180, the results in the following. That is, the upper food-product carrying run 182 of the main conveyor 180 is driven into the tops 95 of the heat exchange tubes 92 or 94. In essence, the upper food-product carrying run 182 is scraping the tops 95 of the heat exchange tubes with pressure, like filing the tops 95 of the heat exchanger tubes 92 or 94 with a rasp, or abrading the tops 95 of the heat exchange tubes 92 or 94 with sandpaper or emery cloth.

This causes erosion to the tops 95 of the heat exchange tubes 92 or 94. It does damage to the main conveyor belt 180 too but the main conveyor belt 180 is a less costly item to replace. And anyways, conveyor belts 180 or 108 are at risk to all kinds of destruction. The main conveyor belt 180 might have to be periodically replaced for reasons other than erosion damage. But not so with the heat exchange tubes 92 or 94. While they are far hardier than wire mesh belts 180 or 108, they do have a vulnerability, and, that would be to erosion by the scraping of the main conveyor belt 180 on their top walls 95. And when one top wall 95 becomes too thin, there is a risk that thermal oil will leak into the fry oil 122 bath (fryer cooking channel 104), which is an immediate breach of sanitation standards and immediate reason for shutting down the food process line.

Moreover, that one extent of that one tube 92 or 94 that is thinned or breached is not easily replaced or repaired (e.g., patched) in the context of the heat exchange tube assembly 90 as a unit, and perhaps the one tube 92 or 94 is not repairable or replaceable (as a practical matter) at all. Instead, the whole heat exchange tube assembly 90, including its inlet and outlet manifolds (neither of which are shown in FIGS. 5 through 8, but see FIG. 9A and FIG. 9B), would likely have to be replaced:—as a unit.

This situation can be likened to an analogy, albeit this might be a bit extreme. It's like a nuclear submarine which is powered by a nuclear core. When the output of the nuclear core runs low, and if the submarine has any useful life left, the submarine is typically re-fueled by cutting the whole submarine in half, and a new core is swapped in for the old core after which the submarine is welded back together.

Again, the analogy may be extreme. But if various ones of the tubes 92 or 94 of the heat exchange tube assembly 90 get too worn, and there is otherwise useful life left in the hot oil fryer 100 as a whole, the fix requires major surgery. The old heat exchange tube assembly 90 is removed and replaced with a new one.

It is an object of the invention to extend the life of heat exchange tube assemblies 200 in accordance with the invention for hot oil fryers 100 for automatic and/or mechanized food process lines. It is perhaps another object of the invention to extend the life of heat exchange tube assemblies 200 in a hot oil fryer 100 to be commensurate with or perhaps exceed by a little margin the projected use life of the hot oil fryer 100. That way, there is likely never to be a need in the future of removing and replacing the original heat exchange tube assembly 200 originally installed stretched out in the frying cooking channel 104.

FIG. 9 shows a heat exchange tube assembly 200 in accordance with the invention, which will lie stretched more or less horizontally in the fryer cooking channel 104 like as shown in FIG. 3 or 4.

FIG. 9A shows the inflow-manifold 202 end of the heat exchange tube assembly 200 of FIG. 9. FIG. 9B shows the outflow-manifold 204 end of the heat exchange tube assembly 200 of FIG. 9. There is essentially little difference. It is generally preferred that the flow of the thermal oil be in the opposite direction of the conveyance of the food product 124. That way, the discharge end 112 for the food product 124 is where the thermal oil is hottest and the infeed end 116 for the food product 124 is where the thermal oil is coolest. But operational preferences might reverse those matters.

In any case, the elongate, flat heat exchange tube assembly 200 is typically produced in lengths ranging from a dozen to dozens of feet long and in widths between twelve and forty inches (~30 cm to ~1 m).

Comparing FIG. 10 to FIGS. 9A and 9B show that the top wall portion 205 of the heat exchange tubes 210 is thicker than sidewall 220f and bottom wall 220w portions, whereas for the manifolds 202 and 204 all the walls are more or less a uniform thickness. For the heat exchange tubes 210, this thicker top wall 205 provides extended life for the heat exchange tubes 210 as the upper food-product carrying run 182 of the stainless steel, wire-mesh, main conveyor belt 180 (shown in dashed lines in FIG. 10) gradually erodes away the top wall portion 205.

FIG. 10A shows one heat exchange tube 210 in isolation from FIG. 9, at a time before the closure strip 225 of a relatively thick stock plate 225 that will serve as the top wall 205 is welded onto the exposed edges of the flanges 220f of the channel 220f, 220w that defines the side and bottom walls 220f and 220w and which channel 220f, 220w is produced of a relatively thinner stock of plate material 230 (or even sheet material 230, which is thinner than plate). Wherein, the 'time' referenced here, before the closure strip 225 is welded shut, affords the opportunity to introduce and lay inside the open channel an elongate and flimsy static flow mixer technology 240 that could otherwise never be snaked in through an open end of a tube 210. Certainly never for dozens of feet in length.

FIGS. 11-17 comprise a series of illustrations depicting manufacturing processes for producing a preferred embodiment of a heat exchange tube 210 in accordance with the invention for hot oil fryers 100 in automatic and/or mechanized food process lines.

FIG. 11 provides an abbreviated representation of a roll forming process for producing steel channel 220f, 220w out of flat sheet stock 230, or thin-plate stock 230.

FIG. 12 is a section view taken along line XII-XII in FIG. 11, showing the rolling feed of flat plate 230 or sheet stock 230.

FIG. 13 is a section view taken along line XIII-XIII in FIG. 11, showing the rolling roll-forming of the flat plate 230 or sheet stock 230 into a shallow V-shape.

FIG. 14 is a section view taken along line XIV-XIV in FIG. 11, showing the progression of the rolling roll-forming wherein the shallow V-shaped plate or sheet stock 230 has been formed into a deeper V-shape.

FIG. 15 is a section view taken along line XV-XV in FIG. 11, showing the progression of the rolling roll-forming wherein the deeper V-shaped plate or sheet stock 230 has been formed into a channel shape 220f, 220w.

FIG. 16 is a section view showing the resultant steel channel 220f, 220w in isolation.

FIG. 17 is a section view showing the steel channel 220f, 220w closed by the elongate closure strip 225 of plate welded to the exposed edges of the upright flanges 220f of the channel 220f, 220w all the way along the opposite seams 250. The preferred welding technique is by TIG welding.

FIGS. 18-20 show various alternate configurations of heat exchange tubes 300, 310 and 320 in accordance with the invention having top wall portions 305, 315 and 325 that are thicker than the side and bottom wall portions, so as to provide extended life for the heat exchange tubes 300, 310 and/or 320 as the stainless steel wire mesh conveyor belt 180 gradually erodes away the top wall portion(s) 305, 315 and/or 325. Since these configurations 300, 310 and 320 are presumptively a product of an extrusion process, these configurations 300, 310 and 320 are not highly preferred because of cost.

FIG. 21 is a section view of a heat exchange tube 330 in accordance with the invention and comparable to those tubes 92 in FIG. 6, and showing this FIG. 21's heat exchange tube 330 being provided with a thicker top wall 335a, 335b by means of making the top wall 335a, 335b a composite construction of two plies 335a and 335b (at least two plies). That is, the top wall 335a, 335b comprises two plies 335a and 335b that cooperatively present a relatively thicker combined-state by taking a tube 92 with a constant wall thickness and adding a strip of material 335b on top and affixing it to the constant wall thickness 335a of the tube 92, which would be welded all the way along the opposite seams.

FIG. 22 is an enlarged-scale section view of one heat exchange tube 210 from FIG. 10 in isolation, except containing an alternate embodiment of static flow mixer technology 240'. FIG. 23 is a perspective view, partly in section, of the heat exchange tube 210 in FIG. 22, that better shows this alternate embodiment of static flow mixer technology 240'. This perspective view is comparable to the perspective view of FIG. 10A except not only showing the closure strip 225 welded shut but also showing the alternate embodiment of static flow mixer technology 240' shown in FIG. 22. Again, at a time before the closure strip 225 is joined to the channel 220f, 220w, the open-top condition of the channel 220f, 220w readily affords the opportunity for insertion into the channel 220f, 220w of this or some form of static flow mixer technology 240.

The static flow mixer technology 240 could be as low tech as chicken wire, or as simple as an elongate coil spring with open coils. Anything could be laid in the open channel 212f, 212w which could otherwise never be snaked in though an open end of the tube 210.

To return to FIGS. 9A, 9B and 10, the manifolds 202, 204 and heat exchange tubes 210 are assembled and joined briefly as follows. The manifolds 202, 204 are provided with a series of rectangular apertures 270 which will closely match the rectangular lumens (rectangular hollow cores) of the heat exchange tubes 210. The heat exchanged tubes 210 are aligned with their ends abutting the apertured sidewall 272 of the respective manifold, with apertures 270 and lumens aligned. Then the seams between the ends of the tubes 210 and manifolds 202, 204 are welded. And again, the preferred weld technology is TIG welding.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A hot oil fryer for automatic and/or mechanized food-process lines, comprising:
   a metal, longitudinally- and generally horizontally-elongated fryer cooking channel extending between an infeed end and a discharge end spaced by a longitudinally-elongated bottom wall as well as spaced longitudinally-elongated sidewalls whereby the fryer cooking channel defines a fry-oil bath;
   a metal, longitudinally- and generally horizontally-elongated heat exchange tube assembly disposed suspended in and lying stretched out more or less horizontally in the fryer cooking channel;
   the metal, longitudinally- and generally horizontally-elongated heat exchange tube assembly comprising:
      a plurality of metal, elongate, longitudinally-extending heat exchange tubes extending between open inflow and outflow ends;
      a metal, laterally-extending abbreviated inflow-manifold tube with one plurality of apertures in a sidewall portion thereof;
      a metal laterally-extending abbreviated outflow-manifold tube with another plurality of apertures in a sidewall portion thereof;
      wherein the plurality of elongate, longitudinally-extending heat exchange tubes are joined to the inflow-manifold tube and outflow-manifold tube respectively with respective alignment among the open ends of the heat exchange tubes and the plurality of apertures in the respective sidewall portions of the manifold tubes; and
   a metal, main food-product motivating endless conveyor belt having a longitudinally-elongated upper food-product carrying run and a longitudinally-elongated lower return run spaced by an infeed nose end and a discharge nose end;
   wherein the metal, longitudinally- and generally horizontally-elongated heat exchange tube assembly is disposed suspended between the longitudinally-elongated upper food-product carrying run and the longitudinally-elongated return run of the main of food-product motivating endless conveyor belt as well as between the infeed nose end and discharge nose end thereof;
   wherein each of the heat exchange tubes similarly comprises a first sidewall portion and a second sidewall portion wherein the first sidewall portion consists a planar top wall and wherein the first sidewall portion is twice as thick or more than the second sidewall portion.

2. The hot oil fryer of claim 1, wherein:
   the second sidewall portion comprises square-U shaped channel having a web bottom wall and flange sidewalls of a given uniform thickness; and
   the first sidewall portion comprises an elongate closure strip welded along spaced seams to the exposed upper edges of the flanges of the square-U shaped channel, thereby forming a thermal oil conduit.

3. The hot oil fryer of claim 2, further comprising:
   a static, flow-mixer technology inserted laid down inside the elongate second sidewall, channel portions of the heat exchange tubes at a time before the elongated first sidewall, closure strip portion is welded along the spaced seams with the exposed upper edges of the flanges of the square-U shaped channel.

4. The hot oil fryer of claim 1, further comprising:

a longitudinally- and generally horizontally-elongated hood for mating or being disposed in close proximity to upper edges of the spaced longitudinally-elongated sidewalls of the fryer cooking channel and thereby covering the fry-oil bath; and a metal, submerging endless conveyor belt having a longitudinally-elongated upper return run and a longitudinally-elongated lower food-product submerging run spaced by an upline nose end and a downline nose end and suspended from the hood such as to submerge food product below a fill line of the fry-oil bath and cause the upper food-product carrying run of the main of food-product motivating endless conveyor belt to scrape along the elongate closure strips of the heat exchange tubes and thereby cause erosion;

whereby the thicker first sidewall, closure strip portion of the heat exchange tubes provides a thicker profile and than the second sidewall portions and hence extends potential use life.

5. The hot oil fryer of claim 1, further comprising:

a metal longitudinally-elongated cabinet for propping up the longitudinally-elongated fryer cooking channel off a base elevation, the cabinet having spaced sidewalls spaced by spaced end walls and enclosing an enclosed space below the bottom wall of the fryer cooking channel;

a longitudinally- and generally horizontally-elongated tubular combustion chamber mounted inside the cabinet and disposed withing the disposed space below and proximate the bottom of the fryer cooking channel.

6. The hot oil fryer of claim 5, further comprising:

a fuel oil system outside of the cabinet for feeding combustion fuel to the combustion chamber inside the cabinet;

a thermal working oil system for flowing between the combustion chamber inside the cabinet and the heat exchange tube assembly inside the fry-oil bath; and a fry-oil system for maintaining the fry-oil bath to the desired fill line as fry-oil is carried away by food product discharged out the discharge end of the hot oil fryer.

7. The hot oil fryer of claim 6, wherein:

thermal working oil system is closed or substantially closed.

8. The hot oil fryer of claim 1, wherein:

wherein each of the heat exchange tubes defines a vertically elongated and generally rectangular lumen.

9. The hot oil fryer of claim 1, wherein:

wherein at least one of the heat exchange tubes defines a vertically elongated and generally rectangular lumen.

10. The hot oil fryer of claim 1, wherein:

wherein each of the heat exchange tubes defines a generally rectangular lumen.

11. The hot oil fryer of claim 1, wherein:

wherein at least one of the heat exchange tubes defines a generally rectangular lumen.

12. The hot oil fryer of claim 1, wherein:

wherein each of the heat exchange tubes defines a generally square lumen.

13. The hot oil fryer of claim 1, wherein:

wherein at least one of the heat exchange tubes defines a generally square lumen.

14. The hot oil fryer of claim 1, wherein:

wherein each of the heat exchange tubes defines a generally triangular lumen.

15. The hot oil fryer of claim 1, wherein:

wherein at least one of the heat exchange tubes defines a generally triangular lumen.

16. The hot oil fryer of claim 1, wherein:

wherein each of the heat exchange tubes defines a characteristic lumen geometry therefor.

17. The hot oil fryer of claim 16, wherein:

wherein each of the heat exchange tubes defines said characteristic lumen geometry therefor such that said characteristic lumen geometry therefor is a common lumen geometry shared in common with all the other heat exchange tubes.

* * * * *